United States Patent
Nehlen, III

(10) Patent No.: US 9,387,421 B1
(45) Date of Patent: Jul. 12, 2016

(54) STRAINER AND STRAINER CONTROL SYSTEM

(71) Applicant: Paul F. Nehlen, III, Lake Geneva, WI (US)

(72) Inventor: Paul F. Nehlen, III, Lake Geneva, WI (US)

(73) Assignee: Neptune-Benson, LLC, Coventry, RI (US)

( * ) Notice: Subject to any disclaimer, the term of this patent is extended or adjusted under 35 U.S.C. 154(b) by 0 days.

(21) Appl. No.: 14/799,202

(22) Filed: Jul. 14, 2015

(51) Int. Cl.
*B01D 21/30* (2006.01)
*B01D 35/00* (2006.01)
*B01D 24/28* (2006.01)
*B01D 29/70* (2006.01)
*B01D 29/05* (2006.01)
*B01D 29/60* (2006.01)
*B01D 37/04* (2006.01)
*C02F 1/00* (2006.01)
*C02F 1/40* (2006.01)

(52) U.S. Cl.
CPC ............... *B01D 29/70* (2013.01); *B01D 29/05* (2013.01); *B01D 29/606* (2013.01); *B01D 37/04* (2013.01); *B01D 37/046* (2013.01); *C02F 1/001* (2013.01); *C02F 1/40* (2013.01); *C02F 2201/002* (2013.01)

(58) Field of Classification Search
None
See application file for complete search history.

(56) References Cited

U.S. PATENT DOCUMENTS

| | | | |
|---|---|---|---|
| 2,891,671 A | 6/1959 | Nilsson | |
| 3,369,669 A | 2/1968 | Loftin | |
| 4,211,653 A * | 7/1980 | Koppe | B01D 33/073 162/330 |
| 4,442,002 A * | 4/1984 | Morris | B29C 47/0886 210/411 |
| 5,108,592 A | 4/1992 | Wilkins et al. | |
| 5,707,512 A | 1/1998 | Koch et al. | |
| 6,508,933 B2 | 1/2003 | Wilkins et al. | |
| 7,063,783 B2 | 6/2006 | Ballet et al. | |
| 8,800,496 B1 | 8/2014 | Roche | |
| 8,871,100 B2 | 10/2014 | Jorgensen et al. | |
| 2005/0247610 A1* | 11/2005 | Frommann | B01D 29/035 210/158 |
| 2006/0207927 A1* | 9/2006 | Tirakian | B24C 9/006 210/416.1 |

FOREIGN PATENT DOCUMENTS

| | | |
|---|---|---|
| CN | 201183761 Y | 1/2009 |
| WO | 2005/045143 | 5/2005 |

\* cited by examiner

*Primary Examiner* — Nam Nguyen
*Assistant Examiner* — Richard Gurtowski
(74) *Attorney, Agent, or Firm* — Salter & Michaelson

(57) ABSTRACT

A screening apparatus that includes a strainer element used for the purpose of retaining particulate while permitting the passage of a liquid through the strainer element, a support structure for the strainer element to enable rotation of the strainer element between opposed 180 degree positions, and a control member coupled with the strainer element for controlling the rotation of the strainer element. The strainer element, in both opposed positions thereof impedes any particulate while permitting the passage of a liquid. The control member is constructed so that, in a first state thereof, the rotation of the strainer element is periodically controlled to rotate the strainer element between said opposed 180 degree positions, and in a second state thereof, inhibits rotation of the strainer element.

12 Claims, 7 Drawing Sheets

STRAINER AND STRAINER CONTROL SYSTEM

FIELD OF THE INVENTION

The present invention relates in general to strainers that may be used in such applications as filtration and fluid flow safety. More particularly, the present invention relates to an improved strainer construction as well as an associated control system. Even more particularly, the present invention relates to a method of controlling a strainer element.

BACKGROUND OF THE INVENTION

In the field of filtration and fluid flow safety there is relatively common use of a device that is identified as a strainer. The strainer or screening device is used to retain foreign objects. The strainer is usually a fixed position device. It is typical to provide access to the strainer for cleaning the strainer. However, this access is many times not very convenient. Also, the typical strainer device is not suited for the receipt and processing of objects that are the result of an upstream breakage or destruction.

Accordingly, it is an object of the present invention to provide an improved screening apparatus in the form of a strainer element, and in which the strainer element is rotatable through 180 degrees in accordance with one mode of operation. This mode of operation enables any foreign objects collected at the strainer to be periodically released.

Another object of the present invention is to provide a control system for controlling a strainer, particularly as to its rotation parameter. The system of the present invention provides an improvement in the overall process so as to maximize the uptime of the process, while simultaneously protecting against any upset or unacceptable event that may occur downstream of the strainer.

Still another object of the present invention is to provide a control system for controlling a strainer element that enables the strainer element, in one mode of operation, to be locked in position so that any foreign objects, debris or detritus is retained at the strainer element for subsequent collection. In accordance with another mode of operation of the control system of the present invention, foreign objects, particularly debris or detritus, may be diverted to a collection receptacle.

A further object of the present invention is to provide a method of controlling a strainer element that is used for the purpose of retaining particulate while permitting the passage of a liquid through the strainer element, and in which control is of, not only the rotation of the strainer element, but also control of valves so as to divert debris or detritus to a collection receptacle.

SUMMARY OF THE INVENTION

To accomplish the foregoing and other objects, features and advantages of the present invention there is provided a screening apparatus comprising a strainer element used for the purpose of retaining particulate while permitting the passage of a liquid through the strainer element, a support structure for the strainer element to enable rotation of the strainer element between opposed 180 degree positions, and a control member coupled with the strainer element for controlling the rotation of the strainer element. The strainer element, in both opposed positions thereof impedes any particulate while permitting the passage of a liquid. The control member is constructed and arranged so that, in a first state thereof, the rotation of the strainer element is periodically controlled to rotate the strainer element between said opposed 180 degree positions, and in a second state thereof, inhibits rotation of the strainer element.

In accordance with other aspects of the present invention the support structure includes a frame, and the strainer element includes a circular strainer member mounted in the frame and a shaft for supporting the strainer member relative to the frame; the control member includes an electro-mechanical mechanism that, in the first state periodically controls the rotation of the shaft between the opposed positions, and in the second state inhibits rotation of the shaft; including a downstream processing device that has the ability to generate a fault signal, the fault signal for controlling the electro-mechanical mechanism, in its second state, to inhibit rotation of the circular strainer member; including, in combination therewith, a first valve disposed upstream of the strainer element and having open and closed positions, the first valve being in the open position in the first state, and being in the closed position in the second state; including, in combination therewith, a second valve disposed upstream of the strainer element and having closed and open positions, the second valve being in the closed position in the first state, and being in the open position in the second state; the control member includes a timer set to determine the periodic control; the control member includes a pressure sensor to determine the periodic control.

In accordance with another aspect of the present invention there is provided a control system for controlling a strainer element that is used for the purpose of retaining particulate while permitting the passage of a liquid through the strainer element, the strainer element rotatable between opposed 180 degree positions, and an electrical controller coupled with the strainer element and for controlling the rotation of the strainer element. The strainer element, in both opposed positions thereof impedes any particulate matter while permitting the passage of a liquid through the strainer element. The electrical controller is constructed and arranged so that, in a first state thereof, the rotation of the strainer element is periodically controlled to rotate the strainer element between the opposed 180 degree positions, and in a second state thereof, is controlled to inhibit rotation of the strainer element.

In accordance with still other aspects of the present invention the rotation of the strainer element includes a support structure having a frame, and the strainer element includes a circular strainer member mounted in the frame and a shaft for supporting the strainer member relative to the frame, the shaft being rotatable in order to rotate the circular strainer member; further including an electro-mechanical mechanism that, in the first state periodically controls the rotation of the shaft and, in turn, the circular strainer member between the opposed positions, and in the second state inhibits rotation of the shaft and, in turn, the circular strainer member; including a downstream processing device that generates a fault signal in response to a fault condition that has occurred, said fault signal for controlling the electro-mechanical mechanism, its second state, to inhibit rotation of said circular strainer member; including a first valve disposed upstream of said strainer element and having open and closed positions, said first valve being in the open position in the first state, and being in the closed position in the second state; including a second valve disposed upstream of said strainer element and having closed and open positions, said second valve being in the closed position in the first state, and being in the open position in the second state; the electrical controller includes a timer set to determine the periodic control; including a downstream processing device that generates a fault signal in response to a fault condition that has occurred and wherein said electrical controller further includes a gate device that is coupled from the timer and also receives the fault signal; the control member includes a pressure sensor to determine the periodic control; including a downstream processing device that generates a fault signal in response to a fault condition that has occurred and wherein said electrical controller further includes a gate device that is coupled from the pressure sensor and also receives the fault signal.

In accordance with still other aspects of the present invention there is provided a method of controlling a strainer element that is used for the purpose of retaining particulate while permitting the passage of a liquid through the strainer element, comprising controlling the strainer element so as to rotate between opposed 180 degree positions, controlling the strainer element so that the strainer element, in both opposed positions thereof, impedes any particulate matter while permitting the passage of a liquid through the strainer element, controlling, in a first state, the rotation of the strainer element so that the strainer element is periodically rotated between said opposed 180 degree positions, and controlling in a second state thereof, so as to inhibit rotation of the strainer element. Other aspects include providing a first valve disposed upstream of said strainer element and having open and closed positions, controlling said first valve to be in the open position in the first state, and controlling said first valve to be in the closed position in the second state; providing a second valve disposed upstream of said strainer element and having closed and open positions, controlling said second valve to be in the closed position in the first state, and controlling said second valve to in the open position in the second state; and providing a downstream processing device that generates a fault signal in response to a fault condition that has occurred, said fault signal for controlling said first and second valves.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Reference is now made to the block diagrams illustrating different modes of operation of the strainer and associated control system for the strainer. One of the purposes of the control system, along with the unique construction of the strainer element, is to maximize the up-time of the system operation. Another feature that is described with regard to the block diagrams is a system for protecting against any fault event or process upset when debris or detritus become entrained in the fluid flow.

Figure 1:
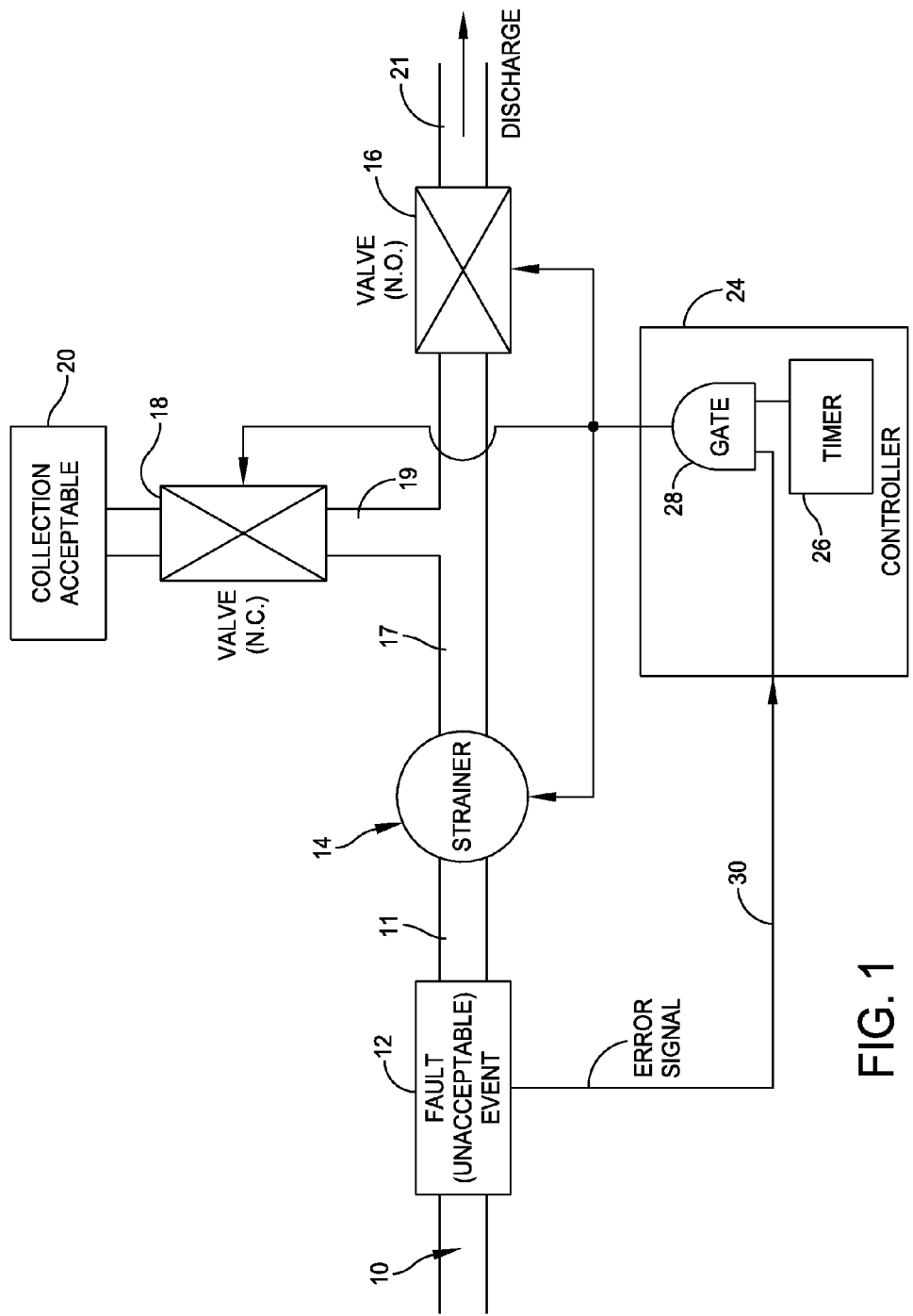
FIG. 1 is a diagram of a first embodiment of a strainer control system in accordance with the present invention and employing a timer control.
Figure 3:
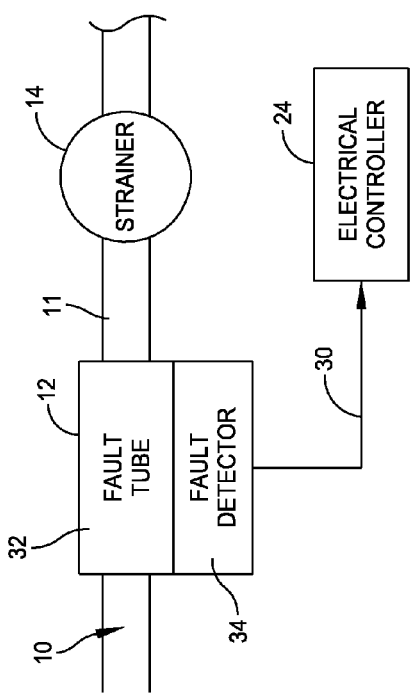
FIG. 3 is a diagram showing somewhat further detail relating to the fault event.
Figure 4:
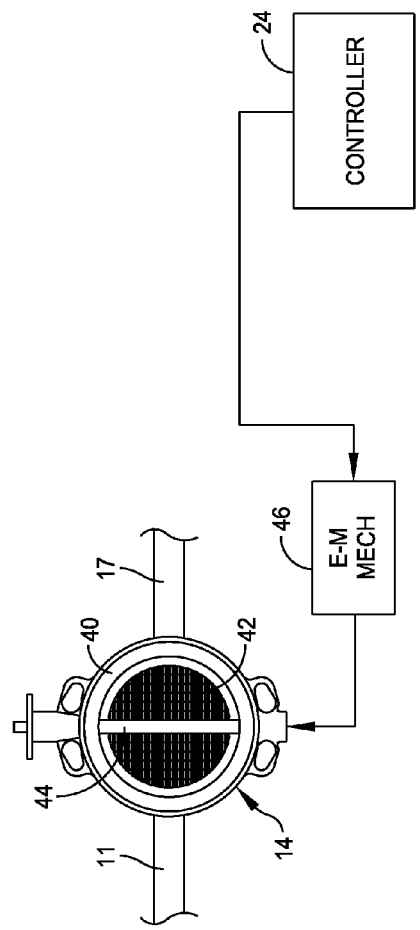
FIG. 4 is a diagram showing further details at the strainer element to illustrate the rotation of the strainer element.
Figure 5:
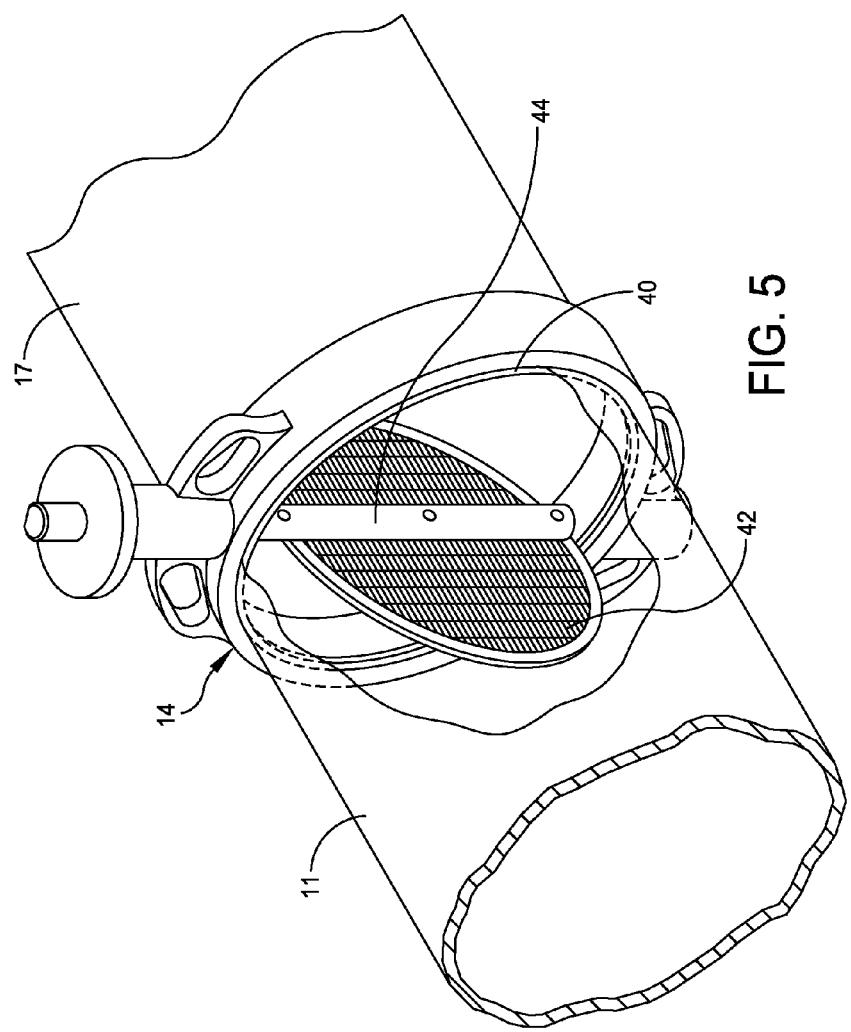
FIG. 5 is a perspective view of the strainer element for illustrating the 180 degree rotation of the strainer element.
Figure 6:
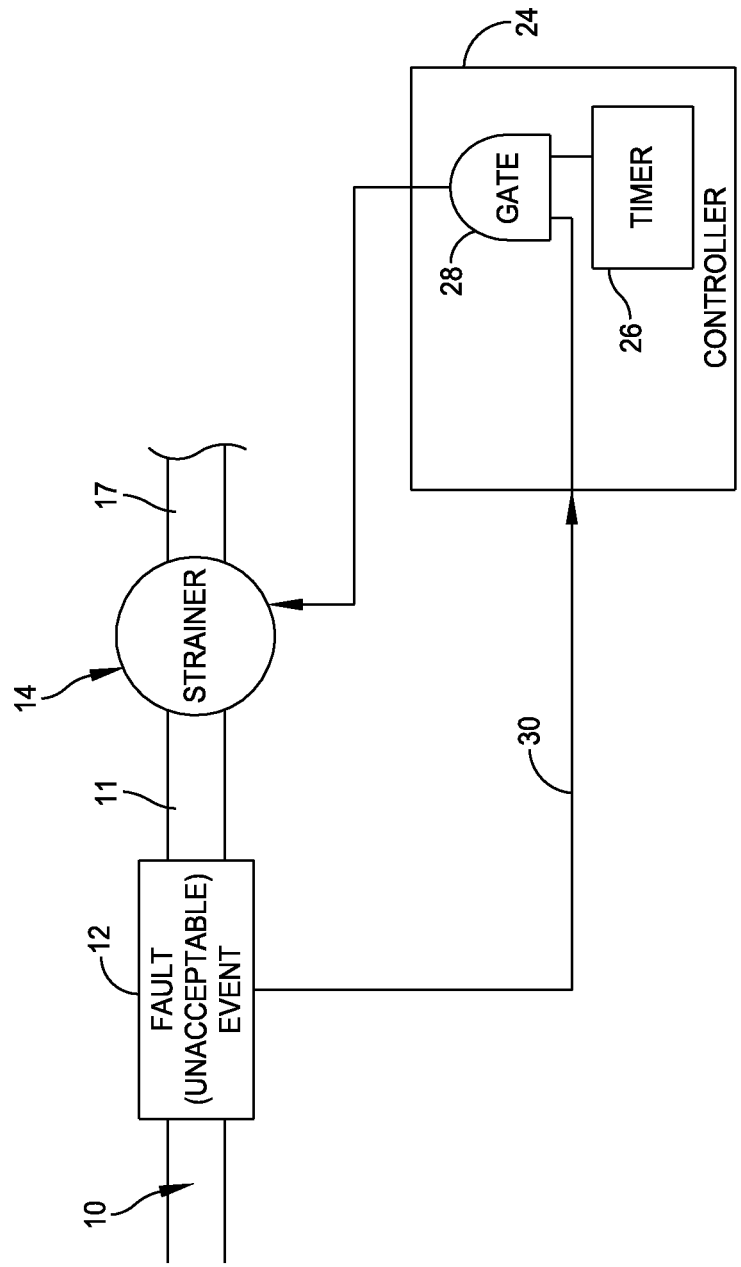
FIG. 6 is a partial system diagram of an alternate embodiment of that described in FIG. 1.
Figure 8:
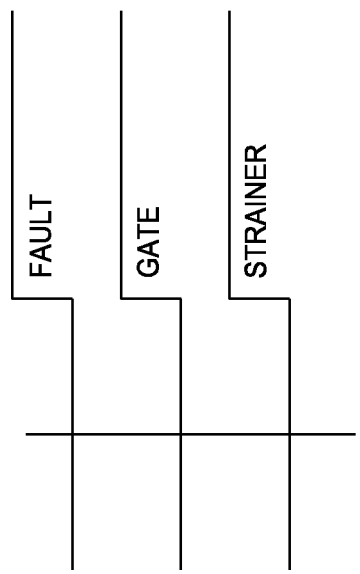
FIG. 8 is a timing diagram associated with the system of FIG. 6.
Figure 7:
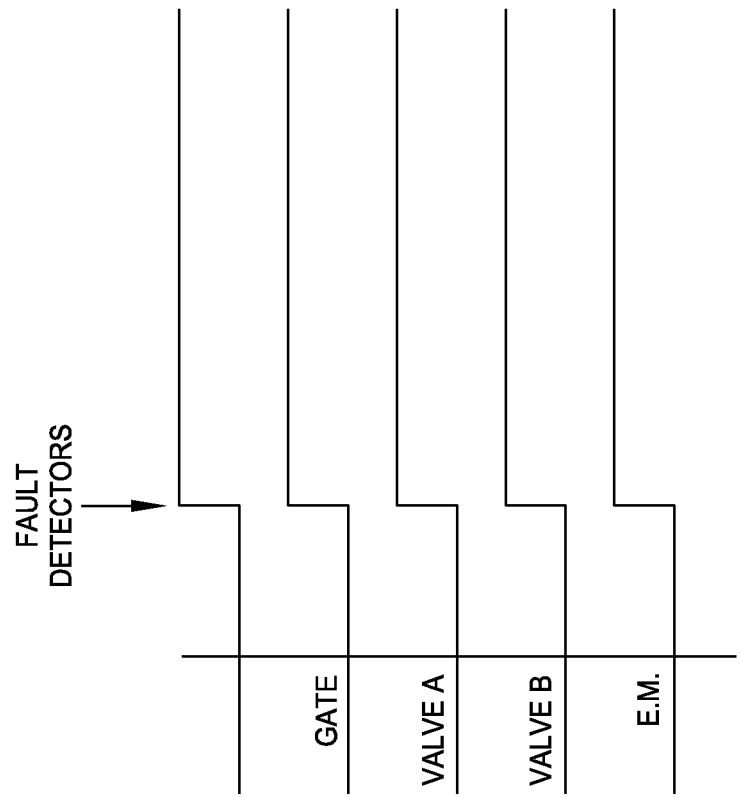
FIG. 7 is a timing diagram associated with the system illustrated in FIG. 1.

FIG. 1 is a schematic block diagram of a first embodiment of the present invention in which the strainer element is controlled for rotation by means of a timer. The second embodiment of the present invention is shown in the block diagram of FIG. 2 in which pressure sensing occurs at the strainer and the rotation of the strainer in turn is controlled by a pressure sensor that senses a pressure differential at the strainer. FIGS. 3-5 show further details associated with either the system of FIG. 1 or the system of FIG. 2. FIG. 6 shows an alternate simplified control diagram. Finally, FIGS. 7 and 8 are timing diagrams associated with the different embodiments described herein.

With reference to the schematic block diagram of FIG. 1, there is illustrated a flow line 10 shown coupled to a fault detector 12 by way of the line or piping 11. Upstream of the fault detector 12 is the strainer 14 of the present invention. The system illustrated in FIG. 1 also includes a downstream valve 16 coupled by way of the piping 17 from the strainer 14. A divert pipe 19 is also shown coupling from the piping 17 to a second valve 18. The second valve 18 can, in turn, connect by way of piping to the collection receptacle 20. The diversion via the valve 18 allows a diversion path of detritus, such as from a fault event. This fault event may be, for example, when a Uv tube, used in a filtration system, breaks and parts of the tube assembly flow to the strainer and are held at the strainer.

In the system in FIG. 1, under normal operating conditions, when there is no fault detected, the controller 24 provides the following operation. Controller 24 may be an electrical controller and is illustrated as including a timer 26 and a gate 28. Under normal, no fault, operation, a timing signal from the timer 26 is coupled by way of the gate 28 to the strainer 14. This action enables the strainer 14 to rotate through 180 degrees thus releasing any foreign objects that had been retained by the strainer. This basic operation is illustrated in FIG. 6 wherein the output of the gate 28 couples only to the strainer element 14. Under a no-fault condition the signal from gate 28 to the valves 16 and 18 is such that both of these valves are maintained in a normal position. The valve 16 is normally open and the valve 18 is normally closed. Thus, under that no fault condition, when the strainer 14 is rotated any foreign objects are coupled by way of the piping 17 and the valve 16 to a discharge point or location at 21. Actually, in the version in FIG. 6 that operation is possible without controlling either of the valves 16 or 18.

If a fault event occurs, and with further reference to FIG. 3, then an error signal is generated on line 30. FIG. 3 illustrates one of many different fault conditions that may occur. FIG. 3 illustrates, for example, a UV tube assembly at 32 that has a fault detector 34 associated therewith. If one of the UV tubes breaks then a signal is generated from detector 34 on the error signal line 30 coupled to the electrical controller 24 and in turn to the sensing gate 28. Under that condition, the output from the gate 28 controls the strainer 14, and the valve 16 as well as the valve 18. The signal from the gate 28 causes the strainer 14 to rotate releasing any of the detritus such as pieces from the UV tube. However, it is desired in accordance with that fault mode of operation that any of the foreign objects, instead of being discharged through the valve 16 to location 21, are discharged through the valve 18 to the collection receptacle 20. Thus, in that mode of operation when the output is generated at the gate 28, this causes the valve 16 to switch from a normally open to a closed position. This blocks the flow of liquid to the discharge at 21. At the same time, the valve 18, which is a normally closed valve, opens and thus the foreign objects are conveyed from the strainer 14, by way of the valve 18, to the collection receptacle 20. This collection receptacle is particularly suited for receiving fault derived items for inspection thereof.

Figure 2:
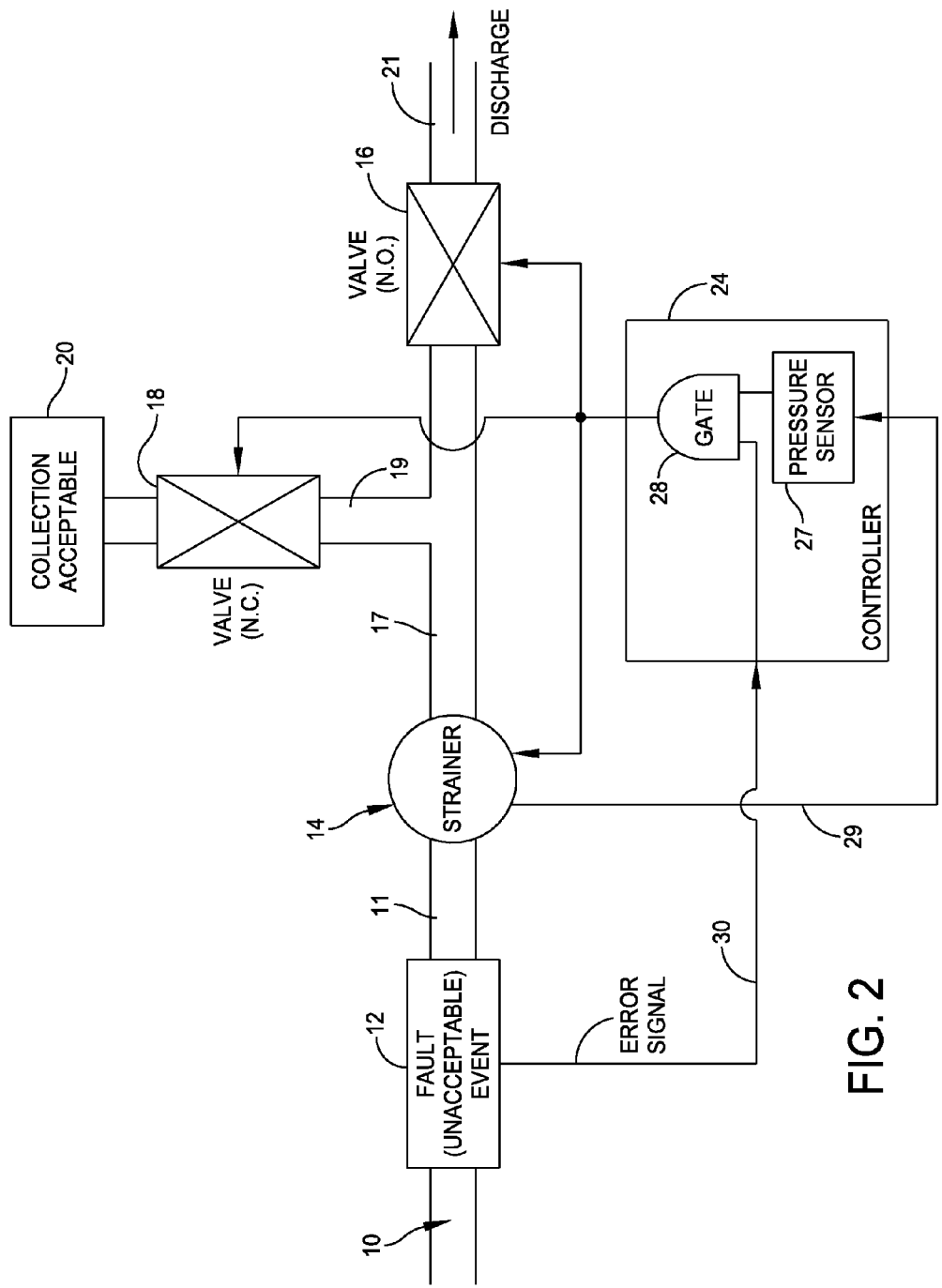
FIG. 2 is diagram of a second embodiment of a strainer control system in accordance with the present invention and employing a pressure sensor.

With reference to the schematic block diagram of FIG. 2, many of the same reference numbers are used as illustrated in FIG. 1 to identify basically the same components. In FIG. 2 there is illustrated a flow line 10 shown coupled to a fault detector 12 by way of the line or piping 11. Upstream of the fault detector 12 is the strainer 14 of the present invention. The system illustrated in FIG. 2 also includes a downstream valve 16 coupled by way of the piping 17 from the strainer 14. A divert pipe 19 is also shown coupling from the piping 17 to a second valve 18. The second valve 18 can, in turn, connect by way of piping to the collection receptacle 20. The diversion via the valve 18 allows a diversion path of detritus, such as from a fault event. This fault event may be, for example, when a Uv tube, used in a filtration system, breaks and parts of the tube assembly flow to the strainer and are held at the strainer.

In the system in FIG. 2, under normal operating conditions, when there is no fault detected, the controller 24 provides the following operation. Controller 24 may be an electrical controller and is illustrated as including a pressure sensor 27 and a gate 28. Under normal, no fault, operation, a timing signal from the pressure sensor 27 is coupled by way of the gate 28 to the strainer 14. This action enables the strainer 14 to rotate through 180 degrees thus releasing any foreign objects that had been retained by the strainer. This basic operation is illustrated in FIG. 6 wherein the output of the gate 28 couples only to the strainer element 14. Under a no-fault condition the signal from gate 28 to the valves 16 and 18 is such that both of these valves are maintained in a normal position. The valve 16 is normally open and the valve 18 is normally closed. Thus, under that no fault condition, when the strainer 14 is rotated any foreign objects are coupled by way of the piping 17 and the valve 16 to a discharge point or location at 21. Actually, in the version in FIG. 6 that operation is possible without controlling either of the valves 16 or 18.

In FIG. 2, rather than using a timer the control at the gate 28 is from the pressure sensor 27. The pressure sensor 27 is responsive to a sensed differential pressure at the strainer 14. For that purpose a pair of pressure sensors may be disposed at opposite upstream and downstream sides of the strainer in order to detect a differential pressure essentially across the strainer 14. This differential pressure is illustrated in FIG. 2 by the feedback line 29 that couples from the pair of sensors at the strainer 14 to the pressure sensor 27. The pressure sensor 27 may have a threshold level that is set so that once a predetermined differential pressure is reached, as detected on line 29, the pressure sensor 27 sends a signal to the gate 28 as previously described in connection with the operation of the embodiment shown in FIG. 1.

FIGS. 4 and 5 describe further details of the strainer element. The strainer element 14 may be considered as comprised of a main support frame 40, the rotatable strainer 42 and support shaft 44. The strainer 42 is fixedly attached to the shaft 44 and rotates upon rotation of the shaft 44. The shaft 44 is supported within the frame 40. Bearings (not shown) may be provided at opposite ends of the shaft 44 between the shaft 44 and the frame 40. These additional details are schematically described in FIG. 4. FIG. 4 also illustrates the controller 24 and an electro-mechanical mechanism 46 that is disposed between the controller 34 and the shaft 44. The electro-mechanical mechanism converts an electrical signal from the controller 24 into a mechanical motion; or in other words causes a 180 degree rotation of the shaft 44. As indicated previously, this rotation may be based either upon a timer, a pressure sensor or may even be based on other input parameters, including but not limited to temperature or temperature differential. Rotation of the shaft 44 causes immediate rotation of the strainer 42.

With reference to the schematic block diagram of FIG. 6, many of the same reference numbers are used as illustrated in FIGS. 1 and 2 to identify basically the same components. In FIG. 6 there is illustrated a flow line 10 shown coupled to a fault detector 12 by way of the line or piping 11. Upstream of the fault detector 12 is the strainer 14 of the present invention. In the system in FIG. 6, under normal operating conditions, when there is no fault detected, the controller 24 provides the following operation. Controller 24 may be an electrical controller and is illustrated as including a timer 26 and a gate 28 (or alternatively a pressure sensor as in FIG. 2). Under normal, no fault, operation, a timing signal from the timer 26 is coupled by way of the gate 28 to the strainer 14. This action enables the strainer 14 to rotate through 180 degrees thus releasing any foreign objects that had been retained by the strainer. This basic operation is illustrated in FIG. 6 wherein the output of the gate 28 couples only to the strainer element 14.

Figure 9:
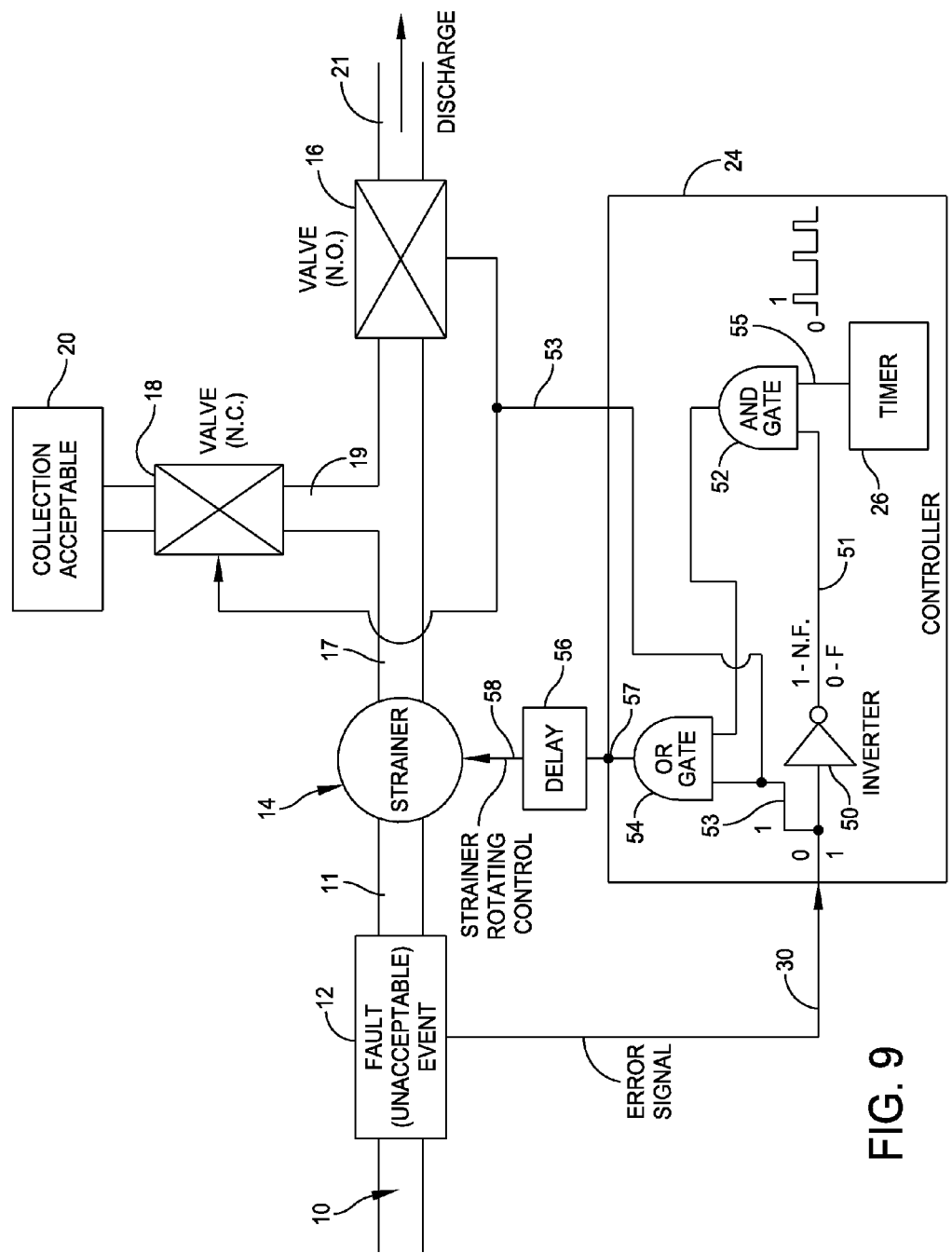
FIG. 9 is an alternate diagram of a strainer control system in accordance with the present invention.

With reference to the schematic block diagram of FIG. 9 there is illustrated a flow line 10 shown coupled to a fault detector 12 by way of the line or piping 11. The fault detector may be the same as illustrated in FIG. 3 including a detector 34 that essentially issues a "fault" signal upon a fault occurring such as a breakage of a component. Downstream of the fault detector 12 is the strainer 14 of the present invention. The system illustrated in FIG. 9 also includes a downstream valve 16 coupled by way of the piping 17 from the strainer 14. A divert pipe 19 is also shown coupling from the piping 17 to a second valve 18. The second valve 18 can, in turn, connect by way of piping to the collection receptacle 20. The diversion via the valve 18 allows a diversion path of detritus, such as from a fault event. This fault event may be, for example, when a Uv tube, used in a filtration system, breaks and parts of the tube assembly flow to the strainer and are held at the strainer for release to a specific collection receptacle.

In the system in FIG. 9, under normal operating conditions, when there is no fault detected, the controller 24 provides the following operation. Controller 24 may be an electrical controller and is illustrated as including a timer 26 and a series of electronic control gates identified in FIG. 9 as an inverter 50, an AND gate 52, and an OR gate 54. Under normal, "no fault", operation, a timing signal from the timer 26 is coupled by way of the gate 52 and gate 54 to the strainer 14. This action enables the strainer 14 to rotate through 180 degrees thus releasing any foreign objects that had been retained by the strainer. This basic operation is also illustrated in FIG. 6 wherein the output of the gate 28 couples only to the strainer element 14. Under a "no-fault" condition the valves 16 and 18 are operated such that both of these valves are maintained in a normal position. The valve 16 is normally open and the valve 18 is normally closed. Thus, under that "no fault" condition, when the strainer 14 is rotated any foreign objects are coupled by way of the piping 17 and the valve 16 to a discharge point or location at 21.

In a "no fault" state, one can consider that the signal on line 30 is at a logical "0" level. This signal is inverted at the inverter gate 50 so that the signal on the line is at a logical "1"

state. This signal, along with the output of the timer 26 on line 55 is coupled to the AND gate 52. The signal on line 51 essentially enables the gate 52 so that any signal pulse from the timer 28 is coupled directly through the AND gate 52 to the OR gate 54, and, in turn, via the delay circuit 56 and lines 57 and 58 to the strainer 14 for control of the rotation of the strainer 14. The periodic output from the timer 26 may be a pulse for operating the electro-mechanical mechanism 46 (see FIG. 4) to cause periodic rotation of the strainer 14. Alternatively, a pressure sensing arrangement may be used in place of the timer, as in FIG. 2. The output of the timer is controlled through the OR gate 54 and the delay 56 to operate the rotation of the strainer 14. Under that same "no fault" condition the logical "0" on line 53 directly controls the valves 16 and 18 so that both of the valves are maintained in their normal, unactuated state. In that state the valve 16 is normally open and the valve 18 is normally closed. Thus, under this "no fault" condition, when the strainer 14 is rotated any foreign objects are coupled by way of the piping 17 and the valve 16 to a discharge point or location at 21.

If a "fault" event occurs, and with further reference to FIG. 3, then an error signal is generated on line 30. FIG. 3 illustrates one of many different fault conditions that may occur. FIG. 3 illustrates, for example, a UV tube assembly at 32 that has a fault detector 34 associated therewith. If one of the UV tubes breaks then a signal is generated from detector 34 on the error signal line 30 coupled to the electrical controller 24 and in turn to the sensing gates 50 and 54. Under that condition, the output from the inverter gate 50 goes to a logical "0" essentially inhibiting the AND gate 52 so that the rotation of the strainer 14 is no longer controlled from the timer. However, the logical "1" signal on input line 30 is coupled via line 53 into one of the two inputs of the OR gate 54. This logical "1" signal on line 53 is coupled via the OR gate 54 and the delay circuit 56 to control rotation of the strainer 14. The delay circuit may be optional. It can be used to delay the rotation signal to the strainer 14 so that one is assured that the valves 16 and 18 are switched to their alternate position before the valves change state. In that way any fault derived items are recovered in the receptacle 20, and not discharged to location 21.

It is desired in accordance with this "fault" mode of operation that any of the foreign objects (event items), instead of being discharged through the valve 16 to location 21, are discharged through the valve 18 to the collection receptacle 20. Thus, in this mode of operation when the output is generated at the line 53, this causes the valve 16 to switch from a normally open to a closed position. This blocks the flow of liquid to the discharge at location 21. At the same time, the valve 18, which is a normally closed valve, opens and thus the foreign objects (event items) are conveyed from the strainer 14, by way of the valve 18, to the collection receptacle 20. This collection receptacle 20 is particularly suited for receiving fault derived items for inspection thereof.

Having now described a limited number of embodiments of the present invention, it should now be apparent to those skilled in the art that numerous other embodiments and modifications thereof are contemplated as falling within the scope of the present invention, as defined by the appended claims. For example, the strainer that has been used is considered as rotating through 180 degrees between positions. However, there may be other strainer configurations in which opposite positions could be attained by means of rotation amounts less than or greater than 180 degrees.

What is claimed is:

1. A screening apparatus comprising a strainer element used for the purpose of retaining particulate while permitting the passage of a liquid through the strainer element, a support structure for the strainer element to enable rotation of the strainer element between opposed 180 degree positions, a control member coupled with the strainer element for controlling the rotation of the strainer element, said strainer element, in both opposed 180 degree positions thereof impeding any particulate while permitting the passage of a liquid, said control member constructed and arranged so that, in a first state thereof, the rotation of the strainer element is controlled to rotate the strainer element between said opposed 180 degree positions, and in a second state thereof, inhibits rotation of the strainer element; wherein the support structure includes a frame, and the strainer element includes a strainer member mounted in the frame and a shaft for supporting the strainer member relative to the frame; wherein said control member includes an electro-mechanical mechanism that, in the first state controls the rotation of the shaft between the opposed 180 degree positions, and in the second state inhibits rotation of the shaft; an upstream processing device disposed upstream of the strainer element and that generates a fault signal representative of the existence of a fault material; a first valve disposed downstream of said strainer element and having open and closed positions, said first valve being in the open position in the first state, and being in the closed position in the second state; a second valve disposed downstream of said strainer element and having closed and open positions, said second valve being in the closed position in the first state, and being in the open position in the second state; piping for interconnecting the upstream processing device, the strainer element, the first valve, the second valve; and an electronic controller responsive to said fault signal for controlling both valves including closing the first valve and opening the second valve so as to discharge the fault material to a collection location.

2. The screening apparatus of claim 1 wherein the strainer member includes a circular strainer member mounted in the frame.

3. The screening apparatus of claim 1 wherein the electronic controller includes a timer for setting a predetermined period of rotation in the first state.

4. The screening apparatus of claim 1 wherein the electronic controller includes a pressure sensor for setting a predetermined period of rotation in the first state.

5. The screening apparatus of claim 1, said strainer element extending in a plane and connected between adjacent piping sections of the piping, said strainer element, in the first position thereof, having its strainer element plane extending substantially orthogonal to a piping longitudinal axis in order to retain particulate, said strainer element, in the second position thereof, having its strainer element plane rotated in a direction of the longitudinal axis of the piping so that the strainer element plane is disposed out of the orthogonal plane so as to release any retained particulate into one of the adjacent piping sections.

6. The screening apparatus of claim 5 wherein the strainer element includes a circular strainer member mounted in the frame.

7. A screening apparatus comprising a strainer element used for the purpose of retaining particulate while permitting the passage of a liquid through the strainer element, a support structure for the strainer element to enable movement of the strainer element within the support structure between alternate positions, a control member coupled with the strainer element for controlling the movement of the strainer element between the alternate positions, wherein the support structure includes a frame, and the strainer element includes a strainer member mounted in the frame; wherein said control member includes an electrical controller having a first state to retain particulate at the strainer and a second state for releasing particulate; an upstream processing device disposed upstream of the strainer element and that generates a fault signal representative of the existence of a fault material; a first valve disposed downstream of said strainer element, controlled from said electrical controller and connecting the strainer element to a discharge site; a second valve disposed downstream of said strainer element, controlled from said electrical controller and connecting the strainer element to a collection site; said first valve being open in the first state in the absence of the fault signal to control the conveyance of particulate to the discharge site; said second valve being open in the second state in the presence of the fault signal to control the conveyance of particulate to the collection site.

8. The screening apparatus of claim 7 wherein the discharge site is separate from the collection site.

9. The screening apparatus of claim 7 wherein the electrical controller includes one of a timer and pressure sensor.

10. The screening apparatus of claim 9 wherein the electrical controller further includes a logic circuit for controlling the first and second valves in a mutually exclusive manner.

11. The screening apparatus of claim 10 wherein the electrical controller further includes logic gates.

12. The screening apparatus of claim 7 wherein the strainer element extends in a plane and is connected between adjacent piping sections of a piping system, said strainer element, in the first position thereof, having its strainer element plane extending substantially orthogonal to a piping system longitudinal axis in order to retain particulate, said strainer element, in the second position thereof, having its strainer element plane rotated in a direction of the longitudinal axis of the piping system so that the strainer element plane is disposed out of the orthogonal plane so as to release any retained particulate into one of the adjacent piping sections.

* * * * *